US012565930B2

(12) United States Patent
Hashimoto et al.

(10) Patent No.: US 12,565,930 B2
(45) Date of Patent: Mar. 3, 2026

(54) SEAL MEMBER AND PRODUCTION METHOD THEREOF

(71) Applicant: CANON KABUSHIKI KAISHA, Tokyo (JP)

(72) Inventors: Yasuhiro Hashimoto, Shizuoka (JP); Yuu Sasano, Shizuoka (JP); Junya Asaoka, Shizuoka (JP); Motoya Fukushima, Shizuoka (JP); Kenta Katayama, Shizuoka (JP); Shota Amano, Kanagawa (JP); Kazunari Ohira, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 18/624,984

(22) Filed: Apr. 2, 2024

(65) Prior Publication Data

US 2024/0337317 A1 Oct. 10, 2024

(30) Foreign Application Priority Data

Apr. 6, 2023 (JP) ................................. 2023-061806

(51) Int. Cl.
F16J 15/10 (2006.01)
B29D 99/00 (2010.01)
B29K 27/18 (2006.01)

(52) U.S. Cl.
CPC ........ *F16J 15/102* (2013.01); *B29D 99/0053* (2013.01); *B29K 2027/18* (2013.01); *B29K 2995/0077* (2013.01)

(58) Field of Classification Search
CPC ......... B32B 27/322; F16J 15/10; F16J 15/102
See application file for complete search history.

(56) References Cited

U.S. PATENT DOCUMENTS

2017/0114258 A1* 4/2017 Iwahara ................. F16J 15/102
2019/0214659 A1* 7/2019 Soga ....................... H01M 8/10

FOREIGN PATENT DOCUMENTS

JP 2014196779 A 10/2014
WO 2015151515 A1 10/2015

* cited by examiner

*Primary Examiner* — Zachary M Davis
(74) *Attorney, Agent, or Firm* — Canon U.S.A., Inc. IP Division

(57) ABSTRACT

A seal member including a resin portion that contains a resin and a polymerization inhibitor, in which when an SP value $[(J/cm^3)^{0.5}]$ of the resin is defined as SPb and an SP value $[(J/cm^3)^{0.5}]$ of the polymerization inhibitor is defined as SPp, a relationship of Expression (1) is satisfied, $$SPp - SPb \leq 16.37 \qquad \text{Expression (1)}$$

when an area of the polymerization inhibitor in a cross section is set to 100% by area in observation of the cross section of the resin portion of the seal member, an area of the domain of the polymerization inhibitor with a short diameter of 5 μm or greater is 25% by area or less.

8 Claims, No Drawings

SEAL MEMBER AND PRODUCTION METHOD THEREOF

BACKGROUND

Field

The present invention relates to a seal member and a production method thereof.

Description of the Related Art

Gaskets (or packings) have been used as seal members at joints between pipes and the like used in chemical plants and the like. When a polymerizable monomer in a liquid state is caused to pass through a pipe by using a resin gasket as a gasket, the monomer soaks into the resin gasket, the soaked monomer is polymerized inside the gasket and formed into a polymer, and as a result, the pipe is blocked in some cases. Such a phenomenon is referred to as "flower blooming phenomenon".

In the related art, a gasket containing, as a base material, polytetrafluoroethylene (PTFE) having high solvent resistance in which permeation is unlikely to occur, a gasket containing a polymerization inhibitor that suppresses polymerization, and the like have been suggested in order to deal with the flower blooming phenomenon (Japanese Patent Laid-Open No. 2014-196779 and WO2015/151515A).

Even when a gasket containing PTFE having high solvent resistance as a base material is used, since the PTFE base material has gaps, the gasket is impregnated with a monomer, and thus a flower blooming phenomenon occurs.

Meanwhile, the effect of suppressing the flower blooming phenomenon is insufficient in some cases even when the base material contains a polymerization inhibitor. Further, a new disadvantage in that the polymerization of a polymerizable monomer is inhibited in the post-step may occur due to desorption and elution of the polymerization inhibitor.

SUMMARY

The present disclosure provides a seal member that prevents the flower blooming phenomenon and does not inhibit the polymerization reaction of a polymerizable monomer in a pipe or a device.

Further, there is provided a method of producing a seal member with the above-described configuration, the method including:

a step of molding the resin to obtain an intermediate molded product; and a step of impregnating the intermediate molded product with a solution obtained by dissolving the polymerization inhibitor in an organic solvent.

Further features of the present disclosure will become apparent from the following description of exemplary embodiments.

DESCRIPTION OF THE EMBODIMENTS

Hereinafter, the present disclosure will be described in detail.

Features of Present Disclosure

The present disclosure relates to a seal member including a resin portion that contains a resin and a polymerization inhibitor, in which when an SP value $[(J/cm^3)^{0.5}]$ of the resin is defined as SPb and an SP value $[(J/cm^3)^{0.5}]$ of the polymerization inhibitor is defined as SPp, a relationship of Expression (1) is satisfied, $$SPp - SPb \leq 16.37 \qquad \text{Expression (1)}$$

when a cross section of the resin portion of the seal member contains a domain of the polymerization inhibitor, and when an area of the polymerization inhibitor in the cross section is set to 100% by area, a proportion of the domain of the polymerization inhibitor with a short diameter of 5 μm or greater is 25% by area or less.

The reason why the effects of the present disclosure are exhibited is not necessarily clear, but the present inventors consider as follows.

Seal members such as gaskets have been used at joints between pipes and the like. A typical fluid does not cause any problems, but minute gaps of a resin portion of a seal member are impregnated with a polymerizable monomer when the seal member has a resin portion and the polymerizable monomer is in a fluid state, the polymerizable monomer is polymerized inside the resin portion, and "flower blooming phenomenon" in which pipes and the like are blocked eventually occurs. Therefore, when minute gaps of the resin portion of the seal member are filled with a polymerization inhibitor, the polymerization reaction inside the resin portion can be suppressed even in a case where the minute gaps of the seal member are impregnated with the polymerizable monomer.

Here, in a case where a condition (i) that a difference (SPp–SPb) between the SP value (SPp) of the polymerization inhibitor and the SP value (SPb) of the resin portion of the seal member is set to 16.37 or less and a condition (ii) that when the cross section contains domains of the polymerization inhibitor and the area of the polymerization inhibitor in the cross section is set to 100% by area, the proportion of the domains of the polymerization inhibitor with a short diameter of 5 μm or greater is 25% by area or less are satisfied, since the polymerization inhibitor is finely dispersed in the resin in a state of having less lumps so that the polymerization reaction can be efficiently suppressed, and the affinity between the resin portion and the polymerization inhibitor is higher than a certain level, the polymerization inhibitor is not desorbed from the resin portion and held for a long time, and thus a flower blooming phenomenon can be suppressed even during long-term use.

Further, elution of the polymerization inhibitor can be suppressed, and thus the polymerization reaction in a device is not inhibited.

Here, when the difference (SPp–SPb) between the SP value (SPp) of the polymerization inhibitor and the SP value (SPb) of the resin portion of the seal member is greater than 16.37, since the polymerization inhibitor is likely to be desorbed from the resin portion, the flower blooming phenomenon cannot be suppressed for a long period of time. Further, in a case where the area of the domains of the polymerization inhibitor with a short diameter of 5 μm or greater among the domains of the polymerization inhibitor is greater than 25% by area when the area of the polymerization inhibitor in the cross section is set to 100% by area in the observation of the cross section of the resin portion in the seal member, the polymerization suppression efficiency is uneven due to a large amount of lumps of the polymerization inhibitor in a dispersed state, and the polymerization suppression efficiency is low due to a small specific surface area, which is not preferable. Further, even when the difference (SPp−SPb) between the SP value (SPp) of the polymerization inhibitor and the SP value (SPb) of the resin portion of the seal member is 16.37 or less, the contact area of the polymerization inhibitor with the resin portion is small in the domains of the polymerization inhibitor with a short diameter of 5 μm or greater, and thus the polymerization inhibitor is likely to be desorbed, which is not preferable.

Identification of Each Configuration Requirement and Method of Measuring Physical Property Value Next, identification of the configuration requirements according to the present disclosure and a method of measuring the physical property value will be described.

Identification of Resin Portion of Seal Member

The composition and the ratio of compounds constituting the resin portion contained in the seal member are identified by a solid-state pyrolysis gas chromatography mass spectrometer (hereinafter, pyrolysis GC/MS) and NMR.

Further, only the resin portion is obtained by separating the resin portion from the seal member. The kind of the compounds constituting the resin portion is analyzed by solid-state pyrolysis GC/MS.

The kind of the compounds constituting the resin portion can be identified by measuring the mass spectrum of the component of a decomposition product derived from the resin portion, which is generated when the resin portion is thermally decomposed in a temperature range of 550° C. to 700° C., and analyzing the decomposition peaks under the following measurement conditions.

Conditions for Measuring Pyrolysis GC/MS

Pyrolysis device: JPS-700 (Japan Analytical Industry Co., Ltd.)

Decomposition temperature: 590° C.

GC/MS device: Focus GC/ISQ (Thermo Fisher Scientific Inc.)

Column: HP-5 MS, length of 60 m, inner diameter of 0.25 mm, film thickness of 0.25 μm Inlet temperature: 200° C.

Flow pressure: 100 kPa

Split: 50 mL/min

MS ionization: EI

Ion source temperature: 200° C., Mass Range: 45 to 650

Next, the abundance ratio between the identified compounds constituting the resin portion is measured and calculated by methods such as solid-state $^{29}$Si-NMR, solid state $^{19}$F-NMR, solid-state $^{13}$C-NMR, $^1$H-NMR, solid-state high resolution $^{19}$F-MAS NMR, and the like depending on the material.

For example, in the solid-state $^{29}$Si-NMR, peaks are detected in different shift regions depending on the number of functional groups bonded to Si of the compounds constituting the resin portion. The number of functional groups can be specified by specifying each peak position using a standard sample. Further, the abundance ratio of each compound constituting the resin portion can be calculated from the obtained peak area.

The measurement conditions for the solid-state $^{29}$Si-NMR are, for example, as follows.

Device: JNM-ECX5002 (JEOL RESONANCE)

Temperature: room temperature

Measuring method: DDMAS method, $^{29}$Si: 45°

Sample tube: zirconia with diameter of 3.2 mmφ

Sample: test tube is filled with sample in powder state

Rotation speed of sample: 10 kHz relaxation delay: 180 s

Scan: 2000

The measurement conditions for the solid-state $^{19}$F-NMR are as follows.

Device: JNM-ECZ400S (JEOL, Ltd.)

Temperature: room temperature

Measuring method: DDMAS method, $^{29}$Si: 45°

Sample tube: zirconia with diameter of 3.2 mmφ

Sample: test tube is filled with sample in powder state

Rotation speed of sample: 10 kHz relaxation delay: 180 s

Scan: 2000

Identification of Polymerization Inhibitor, Measurement of Melting Point, and Measurement of Content The composition and the ratio of compounds constituting the polymerization inhibitor contained in the seal member are identified by a solid-state pyrolysis gas chromatography mass spectrometer (hereinafter, pyrolysis GC/MS) and NMR.

First, when the seal member contains other substances in addition to the polymerization inhibitor, the seal member is dispersed in a solvent such as tetrahydrofuran (THF), the supernatant containing the polymerization inhibitor is recovered by centrifugation or the like using a difference in specific gravity, fractionated by preparative liquid chromatography, and dried, to obtain the polymerization inhibitor. The content of the polymerization inhibitor is calculated from the ratio of the mass of the obtained polymerization inhibitor to the mass of the seal member.

Further, 5 mg of the polymerization inhibitor separated by the above-described method is weighed, 600 μL of deuterated THF is added to the polymerization inhibitor for dissolution, and $^1$H-NMR measurement is performed to calculate the composition ratio based on the integrated value of each peak. Specific conditions for a device are as follows.

Measurement Conditions

Measuring device: JNM-ECA400 FT-NMR (JEOL)

Measuring nuclide: $^1$H

Solvent: deuterated THF

Measuring frequency: 400 MHZ

Pulse width: 3.125 μs

Frequency range: 7500 Hz

Number of times of integration: 64 times

Measurement temperature: room temperature

The melting point of the polymerization inhibitor is defined as the peak top temperature of the endothermic peak when measured by DSC, and is measured by the following method. The peak top temperature of the endothermic peak in differential scanning calorimetry (DSC) is measured in conformity with ASTM D3418-82 using a differential scanning calorimeter "Q2000" (manufactured by TA Instruments). The temperature correction is made by a detection unit of the device using the melting points of indium and zinc, and the heat quantity correction is made by of a detection unit of the device using fusion heat of indium.

Specifically, about 5 mg of the polymerization inhibitor serving as a measurement sample, which has been separated by the above-described method, is accurately weighed and placed in an aluminum pan, and the measurement is performed using an empty aluminum pan as a reference in a measurement temperature range of 30° C. to 200° C. at a temperature increase rate of 10° C./min in a room-temperature and normal-humidity environment. Further, in the measurement, the temperature is increased once to 200° C., continuously decreased to 30° C., and then increased again. The temperature of the peak top of the maximum endothermic peak in a temperature range of 30° C. to 200° C. is determined in the DSC curve (temperature-endothermic quantity curve) obtained in the process of increasing the temperature.

Method of Calculating Solubility Parameter (SP Value)

The solubility parameter (SP value) is determined by using Fedors Equation (2). The values of $\Delta ei$ and $\Delta vi$ will be referred to "evaporation energy and molar volume (25° C.) of atoms and atomic groups, listed in Tables 3 to 9 of Basic Science of Coatings, pp. 54 to 57, 1986 (Maki Shoten)".

Further, the SP value in the present application is in units of $(J/cm^3)^{0.5}$, and can be converted to units of $(J/cm^3)^{0.5}$ by multiplying the value in units of $(cal/cm^3)^{0.5}$ by 2.046.

$$\delta i = (Ev/V)^{1/2} = (\Delta ei/\Delta vi)^{1/2} \qquad \text{Equation (2)}$$

Ev: evaporation energy

V: molar volume $\Delta ei$: evaporation energy of atoms or atomic groups of i component $\Delta vi$: molar volume of atoms or atomic groups of i component Observation of Cross Section of Seal Member with Scanning Transmission Electron Microscope The state of presence of the polymerization inhibitor in the seal member is confirmed by observing the cross section of the seal member with a scanning transmission electron microscope. In an image of the cross section of the seal member observed with a scanning transmission electron microscope, the cross section contains domains of the polymerization inhibitor. The state of presence of the polymerization inhibitor is specified by measuring the number and the shape of domains of the polymerization inhibitor.

The procedures of observing the cross section of the seal member are as follows.

The seal member is embedded in a visible light-curable embedding resin (D-800, manufactured by Nisshin EM Co., Ltd.) and cut to a thickness of 70 nm using an ultrasonic ultramicrotome (UC7, manufactured by Leica).

Among the obtained thin piece samples, ten samples cut along the plane (thickness direction) in a direction horizontal to the surface corresponding to the liquid contact surface of the seal member are arbitrarily selected.

The selected thin piece samples are dyed in a $RuO_4$ gas environment at 500 Pa for 15 minutes using a vacuum dyeing device (VSC4R1H, manufactured by Filgen, Inc.) to create a STEM image using a scanning image mode of a scanning transmission electron microscope (JEM 2800, manufactured by JEOL Ltd.).

An image is acquired by setting the probe size in STEM to 1 nm and the image size to 1024×1024 pixels. Further, a STEM image is acquired by adjusting the contrast of a detector control panel of a bright field image to 1425 and the brightness thereof to 3750 and adjusting the contrast of an image control panel to 0.0, the brightness thereof to 0.5, and the gamma thereof to 1.00.

The obtained STEM image is binarized (threshold 120/255 stages) using image processing software "Image-Pro Plus (manufactured by Media Cybernetics, Inc.)" to clearly distinguish the domains of the polymerization inhibitor from the region of the binder resin.

The portions seen white when the threshold of the binarization is set to 210 are domains of the polymerization inhibitor.

Method of Calculating Area Ratio of Domains of Polymerization Inhibitor with Shortest Diameter of 5 μm or Greater In the selected ten STEM images of cross sections of the seal member, a region with a size of 2 μm×2 μm is arbitrarily selected from each of the images, all the shortest diameters of the domains in the regions are measured, and when the area of the polymerization inhibitor on each cross section is set to 100% by area, the total area of the domains with a shortest diameter of 5 μm or greater in units of % by area is defined as the ratio of the domains of the polymerization inhibitor with a short diameter of 5 μm or greater.

In Regard to Preferable Aspects of Present Disclosure

The present disclosure has the above-described features as the gist, and preferable aspects thereof will be described below.

Ratio of Domains of Polymerization Inhibitor with Short Diameter of 5 μm or Greater In the observation of the cross section of the resin portion in the seal member, when the area of the polymerization inhibitor in the cross section is set to 100% by area, the area of the domains of the polymerization inhibitor with a short diameter of 5 μm or greater is more preferably 15% by area or less.

The reason for this is that the polymerization inhibition efficiency is further increased due to the distribution of the polymerization inhibitor with a high specific surface area in a dispersed state of the polymerization inhibitor, and desorption of the polymerization inhibitor is more suppressed. Further, this is because even in the physical strength of the seal member, the number of local portions with low strength is decreased when the number of domains of the polymerization inhibitor with a size of 5 μm or greater is decreased, and depressions are unlikely to occur even in a case where a pressure is applied thereto.

Content of Polymerization Inhibitor

The content of the polymerization inhibitor of the seal member is preferably 0.1% by mass or greater and 10.0% by mass or less. The reason for this is that the polymerization suppressing action can be sufficiently obtained and the physical strength of the seal member is also excellent in a case where the content thereof is 0.1% by mass or greater and 10.0% by mass or less.

Young's Modulus of Resin Portion

The Young's modulus of the resin portion is preferably 0.1 GPa or greater and 30.0 GPa or less from the viewpoint of obtaining the strength of the seal member and sufficient adhesiveness to a pipe and the like.

Measurement of Young's Modulus of Resin Portion

A method of measuring the Young's modulus using a nanoindentation method is a method of measuring the relationship between a load and a push-in depth (amount of displacement) while pushing a minute diamond indenter into a thin film and calculating the plastic deformation hardness from the measured value. This measuring method has a characteristic that the method is unlikely to be affected by the physical properties of the base layer particularly in the measurement on a thin film with a thickness of 1 mm or less and cracks are unlikely to occur in the thin film when an indenter is pushed into the film. This measuring method has been typically used for measuring the physical properties of an extremely thin film.

A Young's modulus Es of a sample is calculated based on the following equation.

$$Er = \left[(1 - vs^2)/Es + (1 - vi^2)/Ei\right]^{-1} = \sqrt{\pi/2} \cdot S/\beta\sqrt{A}$$

Here, Er represents a composite Young's modulus, Es represents a Young's modulus Es of a sample, Ei represents a Young's modulus of an indenter, vs represents a Poisson's ratio of a sample, vi represents a Poisson's ratio of an indenter, and β represents a constant related to the indenter shape. Further, here, the Young's modulus Es of the sample will also be simply referred to as a Young's modulus E, and the Poisson's ratio vs of the sample will also be simply referred to as a Poisson's ratio v.

Measurement Conditions

Measuring machine: NANO Indenter XP/DCM (manufactured by MTS Systems Corporation)

Measuring indenter: diamond Berkovish indenter having triangular pyramid tip shape Measurement environment: 20° C., 60% RH Measurement sample: resin portion of seal member is cut to size of 5 cm×5 cm to prepare measurement sample Maximum load setting: 25 μN Push-in speed: The load is applied in proportion to the time at a speed that reaches a maximum load of 25 μN in 5 seconds.

Further, ten random points of each of the samples are measured, and the average value thereof is defined as the Young's modulus measured by the nanoindentation method.

SP Value of Each Material

The SP value (SPb) [$(J/cm^3)^{0.5}$] of the resin of the seal member is preferably 16.37 or less and more preferably 14.32 or less from the viewpoint that the resin portion has excellent solvent resistance with respect to a typical polymerizable monomer containing a vinyl group.

The SP value (SPp) [$(J/cm^3)^{0.5}$] of the polymerization inhibitor is preferably 21.48 or greater and 28.64 or less from the viewpoint that the polarity of the polymerization inhibitor is not extremely low or extremely high and the molecular size thereof is not extremely bulky or extremely small, and as a result, the polymerization inhibitor easily adheres to minute gaps of the resin portion of the seal member and is difficult to desorb. As the SP value increases, the molecules are bulkier and the polarity increases. Therefore, when the molecules of the polymerization inhibitor are not bulky, the affinity between the molecules is high, and the contact area in a case of adhesion of the resin portion to minute gaps can be sufficiently ensured, which is preferable. Further, the molecules of the polymerization inhibitor are not extremely small, and thus the molecules are unlikely to flow due to the flow of the polymerizable monomer when the minute gaps of the resin portion are impregnated with the polymerizable monomer. In addition, since the polarity is not extremely low, an adhesive force through the polarity acts on the molecules of the polymerization inhibitor, and thus the molecules of the polymerization inhibitor are unlikely to be separated from each other. Further, since the polarity is not extremely high, the molecules of the polymerization inhibitor are not extremely solidified with each other, and thus the polymerization inhibition effect on the polymerization monomer is large, which is more preferable.

Difference in SP Value

The difference (SPp–SPb) [$(J/cm^3)^{0.5}$] between the SP value (SPp) of the polymerization inhibitor and the SP value (SPb) of the resin portion of the seal member is preferably 9.21 or greater and 16.37 or less.

This is because the affinity of the polymerization inhibitor for the resin portion is high so that the polymerization inhibitor is unlikely to be desorbed from the resin portion, and the polymerization inhibitor is not extremely compatible with the resin portion due to the moderate affinity between the polymerization inhibitor and the resin portion. Therefore, the adhesive force between the molecules of the polymerization inhibitor due to the affinity also strongly acts, and thus the flower blooming phenomenon can be suppressed for a long period of time.

Particularly when the SP value (SPp) [$(J/cm^3)^{0.5}$] of the polymerization inhibitor is 21.48 or greater and 28.64 or less and the difference (SPp–SPb) [$(J/cm^3)^{0.5}$] is 9.21 or greater and 16.37 or less, the above-described effects are high, which is still more preferable.

Material of Resin Portion of Seal Member

As the resin in the resin portion of the seal member, a urethane resin, an acrylic resin, a polyester resin, a polyvinyl chloride resin, an epoxy resin, nylon, styrene butadiene rubber (SBR), isoprene, butadiene rubber, isobutylene rubber, a silicon resin, and a fluorine resin such as polytetrafluoroethylene (PTFE), a tetrafluoroethylene/perfluoroalkoxyethylene copolymer resin (PFA), a tetrafluoroethylene/hexafluoropropylene copolymer resin (FEP), a tetrafluoroethylene/ethylene copolymer resin (ETFE), polyvinylidene fluoride (PVDF), polychlorotrifluoroethylene (PCTFE), or ethylene chlorotrifluoroethylene copolymer (ECTFE) can be used.

Among these, from the viewpoint of the solvent resistance, SBR, isoprene, butadiene rubber, isobutylene rubber, a silicon resin, PTFE, PFA, FEP, ETFE, PVDF, PCTFE, or ECTFE is preferable, PTFE, PVDF, PCTFE, or ECTFE is more preferable, PTFE, PFA, FEP, or ETFE is still more preferable, and PTFE is even still more preferable.

Among the fluorine resins described above, in a case where a polymer obtained by polymerizing monomers containing fluorine atoms and vinyl groups are used, examples of the monomers to be used include 1,1,1,3,3,3-hexafluoroisopropyl methacrylate, 1H,1H,2H,2H-tridecafluoro-n-octyl methacrylate, 1,1,1,3,3,3-hexafluoroisopropyl acrylate, 2,2,3,3,3-pentafluoropropyl methacrylate, 1,1,2,2,3,3-hexafluoro-1-(trifluoromethoxy)-3-[(1,2,2-trifluorovinyl)oxy]propane, 1H,1H,5H-octafluoropentyl acrylate, pentafluorophenyl methacrylate, 1H,1H,2H,2H-heptadecafluorodecyl acrylate, 2,2,3,3,4,4,5,5,6,6,7,7-dodecafluoroheptyl acrylate, 3,3,4,4,5,5,6,6,6-nonafluoro-1-hexene, 1H,1H,2H,2H-nonafluorohexyl methacrylate, (perfluorohexyl)ethylene, 1,1,1-trifluoro-2-(trifluoromethyl)-4-penten-2-ol, 1H,1H,2H,2H-tridecafluoro-n-octyl acrylate, 1H,1H-pentadecafluoro-n-octyl acrylate, pentafluorophenyl acrylate, 2,3,4,5,6-pentafluorostyrene, 4-bromo-3,3,4,4-tetrafluoro-1-butene, 1,6-bis(acryloyloxy)-2,2,3,3,4,4,5,5-octafluorohexane, 2-(heptafluoropropoxy)hexafluoropropyl trifluorovinyl ether, 2,2,3,3-tetrafluoro-3-[[1,1,1,2,3,3-hexafluoro-3-[(1,2,2-trifluorovinyl)oxy]propan-2-yl]oxy]propionitrile, pentafluorobenzyl methacrylate, 2,2,3,3-tetrafluoropropyl acrylate, 1H,1H,5H-octafluoropentyl methacrylate, 1H,1H,2H-heptadecafluoro-1-decene, 2,2,2-trifluoroethyl methacrylate, methyl 2-fluoroacrylate, 2,2,3,4,4,4-hexafluorobutyl methacrylate, 2,2,3,3,4,4,5,5,6,6,7,7-dodecafluoroheptyl methacrylate, 1H,1H,2H,2H-nonafluorohexyl methacrylate, 2,2,3,3,4,4,4-heptafluorobutyl methacrylate, allyl pentafluorobenzene, 1-(3-butenyloxy)-2,3,3,4,4,5,5-heptafluorocyclopentene, vinyl trifluoroacetate, and 2-(trifluoromethyl)acrylic acid.

Particularly, a PTFE fine powder (also referred to as a PTFE aggregated dispersion) can be preferably used. The PTFE fine powder is a PTFE powder produced by coagulating and drying an aqueous dispersion (PTFE dispersion, also referred to as a PTFE aqueous dispersion) formed of PTFE fine particles with an average particle diameter of 0.1 μm or greater and 0.5 μm or less, which is obtained by emulsion polymerization of tetrafluoroethylene. The average particle diameter of the PTFE powder is, for example, 200 μm or greater and 1000 μm or less.

The number average molecular weight of PTFE is determined by a method of determining heat of crystallization of polymer PTFE with a differential scanning calorimeter (DSC) and calculating the number average molecular weight based on the determined heat of crystallization. Specifically, 9.400 mg of a sample of polymer PTFE is weighed using a differential scanning calorimeter DSC-60A (manufactured by Shimadzu Corporation), heated to 380° C. from room temperature at a rate of 10° C./min, and cooled to 200° C. at a rate of 10° C./min. Further, the heat of crystallization (ΔHc: heat of crystallization in DSC, cal/g) is determined based on the peak area observed around 315° C. during the cooling and the amount of the sample. Further, the number average molecular weight Mn is determined by a relational equation between the number average molecular weight Mn and the heat of crystallization, represented by Equation (I).

$$Mn = 2.1 \times 10^{10} \Delta Hc^{-5.16} \qquad \text{(I)}$$

Structure of Polymerization Inhibitor

An amine-based polymerization inhibitor and/or a phenolic polymerization inhibitor can be used as the polymerization inhibitor contained in the seal member of the present disclosure.

Examples of the amine-based polymerization inhibitor include phenothiazine, N,N'-di-naphthyl-p-phenylenediamine, poly(2,2,4-trimethyl-1,2-dihydroquinoline), di(4-octylphenyl)amine, 4,4'-bis(α,α-dimethylbenzyl)diphenylamine, and N-(1,3-dimethylbutyl)-N'-phenyl-1,4-phenylenediamine.

As the amine-based polymerization inhibitor, an aromatic secondary diamine-based compound such as N-phenyl-1-naphthylamine, octylated diphenylamine, 4,4'-bis(α,α-dimethylbenzyl)diphenylamine, p-(p-toluenesulfonylamide)diphenylamine, N,N'-diphenyl-p-phenylenediamine, N-phenyl-N'-isopropyl-p-phenylenediamine, N-phenyl-N'-(1,3-dimethylbutyl)-p-phenylenediamine, or N-phenyl-N'-(3-methacryloyloxy-2-hydroxypropyl)-p-phenylenediamine can be used in addition to those described above. Further, NOCRAC ODA and NOCRAC ODA-N (both manufactured by Ouchi Shinko Chemical Industrial Co., Ltd.) can also be used.

Examples of the phenolic polymerization inhibitor include a catechol compound such as 3,5-di-tert-butylcatechol or 4-tert-butylcatechol, a phenol compound such as 4-methylphenol, 4-methoxyphenol, 2,6-di-tert-butylphenol, 6-tert-butyl-2,4-xylenol, or 2,4-dinitrophenol, a hydroquinone compound such as hydroquinone, 2,5-di-tert-butylhydroquinone, or 2-tert-butylhydroquinone, 2,6-di-tert-butyl-p-cresol, 2,2'-methylenebis(1,4-benzenediol), 4,4'-methylenebis(2-methylbenzene-1,3-diol), 2,2'-methylenebis(6-methyl-1,4-benzenediol), 2,2'-methylenebis(4-methylphenol), 2,2'-methylenebis(4-methyl-6-tert-butylphenol), and 2,2'-methylbis(4-ethyl-6-tert-butylphenol).

Further, both of a phenolic hydroxyl group and an amine group can be used even in a case of compounds such as 2-oxydiphenylamine.

A structure in which the polymerization inhibitor contains two phenolic hydroxyl groups is more preferable, and particularly a structure in which the polymerization inhibitor contains 1,4-benzenediol is more preferable. This is because the polymerization inhibition action is strong, and the affinity between the molecules of the polymerization inhibitor is strong due to the aromatic π-π stacking and the hydrogen bond between the hydroxyl groups, the polymerization inhibitor is likely to be coordinated and thus unlikely to be eluted due to a strong holding force. Further, particularly when the resin portion is a fluorine atom-containing resin, since the electron-withdrawing property of the fluorine atoms is high, the resin portion is electrostatically bonded to the hydroxyl group contained in the polymerization inhibitor, and the polarization of the hydroxyl group is a phenolic hydroxyl group. Therefore, since electrons are stabilized with a benzene ring, the resin portion, the polymerization inhibitor, and the molecules of the polymerization inhibitor are respectively coordinated or electrostatically bonded to each other to form a network, and thus the polymerization inhibitor is unlikely to be desorbed, which is preferable. The above-described effects are high particularly in a case of a structure in which the polymerization inhibitor contains 1,4-benzenediol.

Further, in a case of a structure in which the resin portion of the seal member is polytetrafluoroethylene and the polymerization inhibitor contains 1,4-benzenediol, the affinity between the resin portion and the polymerization inhibitor is higher, and the polymerization inhibitor is unlikely to be desorbed, which is more preferable.

In a case of a structure in which the polymerization inhibitor contains two phenolic hydroxyl groups, since the electrostatic bond between the molecules of the polymerization inhibitor is not extremely strong, the affinity of the polymerization inhibitor for the seal member is excellent, the polarity of the polymerization inhibitor is not extremely high, the polymerization inhibitor is moderately compatible with the polymerizable monomer, and thus the polymerization inhibition action is also excellent, which is more preferable, as compared with a case of a structure in which the polymerization inhibitor contains three or more phenolic hydroxyl groups.

Accordingly, when the resin portion of the seal member is polytetrafluoroethylene, 2,2'-methylenebis(4-methyl-6-tert-butylphenol), 2,2'-methylenebis(4-ethyl-6-tert-butylphenol), 3,5-di-tert-butylcatechol, 4-tert-butylcatechol, hydroquinone, 2-tert-butylhydroquinone, or 2,5-di-tert-hydroquinone is preferable, and 2-tert-butylhydroquinone or 2,5-di-tert-hydroquinone is particularly preferable as the polymerization inhibitor.

Particularly in a case of a structure in which the resin portion of the seal member is polytetrafluoroethylene, the SP value (SPp) $[(\text{J/cm}^3)^{0.5}]$ of the polymerization inhibitor is 21.48 or greater and 28.64 or less, the difference (SPp–SPb) $[(\text{J/cm}^3)^{0.5}]$ is 9.21 or greater and 16.37 or less, and the polymerization inhibitor contains 1,4-benzenediol, the polymerization inhibition action is strong, the polymerization inhibitor is unlikely to be desorbed or eluted, and thus the flower blooming phenomenon can be suppressed for a long period of time, which is particularly preferable.

Melting Point of Polymerization Inhibitor

From the viewpoint of the heat resistance, the melting point of the polymerization inhibitor is preferably 70° C. or higher, more preferably 95° C. or higher, and still more preferably 120° C. or higher. Particularly when the melting point thereof is 120° C. or higher, the polymerization inhibitor can be used not only in a polymerization reaction step but also in a distillation step, which is preferable.

Other Fillers

The seal member of the present disclosure may further contain a filler. Examples of the filler include alumina, titanium oxide, silica, barium sulfate, silicon carbide, silicon nitride, glass fibers, glass beads, mica, talc, graphite, carbon fibers, calcium carbonate, barium sulfate, kaolin, and clay. The fillers can be used alone or in combination of two or more kinds thereof.

Among the fillers, alumina and/or titanium oxide is preferable. The alumina and titanium oxide have an effect of improving the whiteness degree of the seal member and can be expected to have an effect of improving the heat resistance and an effect of suppressing polymerization.

The content of one or more of fillers selected from alumina, titanium oxide, silica, barium sulfate, silicon carbide, silicon nitride, glass fibers, glass beads, and mica of the seal member of the present disclosure is, for example, 0.5% by mass or greater and 50% by mass or less and preferably 1% by mass or greater and 35% by mass or less.

The seal member of the present disclosure may be formed of polytetrafluoroethylene or modified polytetrafluoroethylene, an unmodified polymerization inhibitor, and optionally one or more kinds of fillers selected from alumina, titanium oxide, glass fibers, glass beads, and mica or may consist of only these materials.

Further, the PTFE composition may contain an extrusion pressure reducing agent reducing the extrusion pressure that is increased due to the content of a filling agent. The extrusion pressure significantly increases due to the content of the filling agent when the content of the filling agent in the PTFE composition is 40% by mass or greater. For example, the extrusion pressure reducing agent may be a compound that reduces friction between filling agent particles contained in the PTFE composition and particles of other blended materials such as PTFE. Specifically, one or two or more compounds selected from the group consisting of an organic silane compound, an organic titanate compound, an organic aluminate compound, and a surfactant, which contain a hydrocarbon group having 3 or more and 40 or less carbon atoms, may be used. As the surfactant, a cationic surfactant, an anionic surfactant, a nonionic surfactant, or an amphoteric surfactant may be used.

Further, the content of the extrusion pressure reducing agent in the PTFE composition may be set to, for example, 0.2% by mass or greater and 10% by mass or less, 0.2% by mass or greater and 8% by mass or less, or 0.5% by mass or greater and 6% by mass or less.

Form of Seal Member

The seal member may be preferably a packing, an O-ring, or a gasket and more preferably a gasket. This is because a gasket serving as a seal member used on a stationary surface does not apply a stress to minute gaps of the resin portion of the seal member, and thus the polymerization inhibitor is not desorbed by an external force.

Method of Producing Seal Member

It is preferable that the method of producing the seal member of the present disclosure is a method of producing a seal member of molding the resin portion to obtain an intermediate molded product and impregnating the intermediate molded product with a solution obtained by dissolving the polymerization inhibitor in an organic solvent to obtain the seal member.

This is because the size of the gaps of the seal member is easily controlled so that generation of large gaps can be suppressed, the gaps of the seal member can be sufficiently filled with the polymerization inhibitor by impregnating the gaps with the polymerization inhibitor dissolved in an organic solvent, and thus the effects of the present disclosure are exhibited, which is preferable.

Further, since the polymerization inhibitor filling the gaps is not exposed to a high temperature, pyrolysis or the like of the polymerization inhibitor does not occur, and the performance of the polymerization inhibitor is not degraded, which is preferable. Further, even when the molding method is arbitrarily selected according to the material that forms the resin portion, the polymerization inhibitor can also be arbitrarily selected, which is preferable. Therefore, the shape of the resin portion can be arbitrarily controlled.

As the organic solvent used here, alcohol, acetone, ether, or the like that can be easily removed later is preferable.

Further, a method of the related art may be used as a method of molding the resin portion in the method of producing the seal member. Particularly when PTFE is used, examples of the method include a method of filling a die with a raw material containing PTFE, performing compression molding at a surface pressure of 20 MPa or greater and 60 MPa or less, and calcinating the compression molded product at 350° C. or higher and 370° C. or lower, a production method using melt molding, and a method of cutting an outer peripheral surface of a calcinated cylindrical body in a longitudinal direction to form a sheet and punching the produced sheet into a circular shape.

EXAMPLES

Example 1

Production of Intermediate Molded Product

A die was filled with a PTFE powder, and the powder was compression-molded at a press pressure of 40 MPa for 0.5 hours in the vertical direction, thereby obtaining a preliminarily molded product (outer diameter of 100 mm×height of 20 mm).

The obtained preliminarily molded product was put into a calcination furnace and calcinated at 370° C. for 5 hours. The obtained cylindrical calcinated product (outer diameter of 100 mm×height of 20 mm) was subjected to lathe processing to produce a sheet having a thickness of 1.5 mm. The sheet was punched out, thereby obtaining an intermediate molded product of a gasket having a donut shape (cylindrical shape).

Production of Gasket

The obtained intermediate molded product was immersed in a solution obtained by dissolving 2-tert-butylhydroquinone (polymerization inhibitor) in methanol at a concentration of 20% by mass and allowed to stand for 24 hours. The amount of the solution of 2-tert-butylhydroquinone in methanol was set to ten times the volume of the sheet.

Thereafter, the sheet was placed in a vacuum dryer in a temperature environment of 25° C. to remove alcohol, thereby obtaining a gasket 1.

Examples 2 to 11, Examples 13 to 15, 19 to 22,
25, and 26, and Comparative Examples 1 to 3

Gaskets 2 to 11, 13 to 15, 19 to 22, 25 and 26, and 27 to 29 were obtained by the same method as in Example 1 except that the kind and the amount of the raw material were changed as listed in Tables 1 and 2.

Example 16

A gasket 16 was obtained by the same method as in Example 1 except that the addition amount of the polymerization inhibitor was changed as listed in Table 2 and the press pressure was changed to 50 MPa.

Example 17

A gasket 17 was obtained by the same method as in Example 1 except that the addition amount of the polymerization inhibitor was changed as listed in Table 2 and the press pressure was changed to 35 MPa.

Example 18

A gasket 18 was obtained by the same method as in Example 1 except that the addition amount of the polymerization inhibitor was changed as listed in Table 2 and the press pressure was changed to 30 MPa.

Examples 23 and 24

A packing 1 and an O-ring 1 were obtained in the same manner as in Example 1 except that the shape was changed as listed in Table 2.

Example 12

Production of Acrylic Resin 2

100 parts by mass of propylene glycol monomethyl ether was heated while carrying out substitution with nitrogen, and refluxed at a liquid temperature of 120° C. or higher, and a mixture obtained by mixing 250 parts by mass of 1H,1H, 2H-heptadecafluorodecyl acrylate, 50 parts by mass of hydroxyethyl acrylate, and 1.00 parts by mass of tert-butyl peroxybenzoate [trade name, "PERBUTYL Z", manufactured by NOF Corporation, organic peroxide-based polymerization initiator] was added dropwise thereto over 3 hours. After completion of the dropwise addition, the solution was stirred for 3 hours, distilled off at a normal pressure while being heated to a liquid temperature of 170° C., distilled off under reduced pressure at 1 hPa for 1 hour after the liquid temperature reached 170° C. to remove the solvent, thereby obtaining a resin solid material.

The solid material was dissolved in tetrahydrofuran and reprecipitated with n-hexane, and the deposited solid was separated by filtration, thereby obtaining an acrylic resin 2. The physical properties of the obtained acrylic resin 2 are shown below.

Weight-average molecular weight $(Mw) = 15000,$ $Mw/Mn = 2.4$, glass transition temperature $(Tg) = 70°$ C.

Production of Intermediate Molded Product 300 parts by mass of the acrylic resin 2 and 50 parts by mass of hexamethylenediamine were placed in a die and cured using a urethane bond in a convection oven at 80° C. for 10 hours, thereby obtaining a cylindrical molded product. The obtained cylindrical calcinated product (outer diameter of 100 mm×height of 20 mm) was subjected to lathe processing to produce a sheet having a thickness of 1.5 mm. The sheet was punched out, thereby obtaining an intermediate molded product of a gasket having a donut shape (cylindrical shape).

Production of Gasket

The obtained intermediate molded product was immersed in a solution obtained by dissolving 2-tert-butylhydroquinone in methanol at a concentration of 20% by mass and allowed to stand for 24 hours. The amount of the solution of 2-tert-butylhydroquinone in methanol was set to ten times the volume of the sheet. Thereafter, the sheet was placed in a vacuum dryer in a temperature environment of 25° C. to remove alcohol, thereby obtaining a gasket 12.

Comparative Example 4

A die was filled with a mixture obtained by mixing a PTFE powder and 2-tert-butylhydroquinone at a mass ratio of 100:2, and the mixture was compression-molded at a press pressure of 50 MPa for 0.5 hours in the vertical direction, thereby obtaining a preliminarily molded product (outer diameter of 100 mm×height of 20 mm).

The obtained preliminarily molded product was put into a calcination furnace and calcinated at 370° C. for 5 hours. The obtained cylindrical calcinated product (outer diameter of 100 mm×height of 20 mm) was subjected to lathe processing to produce a sheet having a thickness of 1.5 mm. The sheet was punched out, thereby obtaining a gasket 30 having a donut shape (cylindrical shape).

Comparative Examples 5 to 8

Gaskets 31 to 34 were obtained in the same manner as in Comparative Example 4 except that the press pressure was changed to 40 MPa and the kind and the amount of the raw material were changed as listed in Table 2.

TABLE 1

| Name | Contents | SP value (SPb) | Number average molecular weight |
|---|---|---|---|
| PTFE | Polytetrafluoroethylene | 12.9 | 1200000 |
| PFA | Copolymer resin containing tetrafluoroethylene/perfluoroalkoxyethylene at ratio of 1:1 | 13.5 | 1250000 |
| ETFE | Copolymer resin containing tetrafluoroethylene/ethylene at ratio of 1:1 | 13.7 | 1200000 |
| FEP | Copolymer resin containing tetrafluoroethylene/hexafluoropropylene at ratio of 1:1 | 12.9 | 1250000 |
| Acrylic resin 1 | 1H,1H,2H-Heptadecafluorodecyl Acrylate polymer | 16.2 | — |

TABLE 2

| | Resin portion | | | | Polymerization inhibitor | |
| | Material | SPb [(J/ cm³)⁰·⁵] | Young's modulus [GPa] | Type | Concentration of solution of polymerization inhibitor in methanol [mass %] | Content [mass %] |
|---|---|---|---|---|---|---|
| Example 1 | PTFE | 12.9 | 0.5 | 2-tert-Butylhydroquinone | 20 | 1.5 |
| Example 2 | PTFE | 12.9 | 0.5 | Hydroquinone | 20 | 1.5 |
| Example 3 | PTFE | 12.9 | 0.5 | 2,5-di-tert-Butylhydroquinone | 20 | 1.5 |
| Example 4 | PTFE | 12.9 | 0.5 | 3,5-di-tert-Butylcatechol | 20 | 1.5 |
| Example 5 | PTFE | 12.9 | 0.5 | 2,6-di-tert-Butyl-p-cresol | 20 | 1.5 |
| Example 6 | PTFE | 12.9 | 0.5 | 2-tert-Butylcatechol | 20 | 1.5 |
| Example 7 | PTFE | 12.9 | 0.5 | 4-Methoxyphenol | 20 | 1.5 |
| Example 8 | PTFE | 12.9 | 0.5 | 4-Methylphenol | 20 | 1.5 |
| Example 9 | PTFE | 12.9 | 0.5 | 2.2'-Methylenebis(4-methylphenol) | 20 | 1.5 |
| Example 10 | PTFE | 12.9 | 0.5 | Phenothiazine | 20 | 1.5 |
| Example 11 | PTFE | 12.9 | 0.5 | 2-Oxydiphenylamine | 20 | 1.5 |
| Example 12 | Acrylic resin 2 | 16.2 | 0.15 | 2-tert-Butylhydroquinone | 20 | 1.5 |
| Example 13 | PFA | 13.5 | 0.4 | 2-tert-Butylhydroquinone | 20 | 1.5 |
| Example 14 | ETFE | 13.7 | 0.4 | 2-tert-Butylhydroquinone | 20 | 1.5 |
| Example 15 | FEP | 12.9 | 0.4 | 2-tert-Butylhydroquinone | 20 | 1.5 |
| Example 16 | PTFE | 12.9 | 0.6 | 2-tert-Butylhydroquinone | 7 | 0.5 |
| Example 17 | PTFE | 12.9 | 0.5 | 2-tert-Butylhydroquinone | 24 | 2.5 |
| Example 18 | PTFE | 12.9 | 0.5 | 2-tert-Butylhydroquinone | 27 | 8.5 |
| Example 19 | PTFE | 12.9 | 0.5 | 2-tert-Butylhydroquinone | 5 | 0.3 |
| Example 20 | PTFE | 12.9 | 0.5 | 2-tert-Butylhydroquinone | 25 | 3.5 |
| Example 21 | PTFE | 12.9 | 0.5 | 2-tert-Butylhydroquinone | 28 | 6.2 |
| Example 22 | PTFE | 12.9 | 0.5 | 2-tert-Butylhydroquinone | 30 | 9.3 |
| Example 23 | PTFE | 12.9 | 0.5 | 2-tert-Butylhydroquinone | 20 | 1.5 |
| Example 24 | PTFE | 12.9 | 0.5 | 2-tert-Butylhydroquinone | 20 | 1.5 |
| Example 25 | Acrylic resin 1 | 16.2 | 0.5 | 4,4'-Methylenebis(2-methylbenzene-1,3-diol) | 20 | 1.5 |
| Example 26 | Acrylic resin 1 | 16.2 | 0.5 | 2,5-di-tert-Hydroquinone | 20 | 1.5 |
| Comparative Example 1 | PTFE | 12.9 | 0.5 | — | — | — |
| Comparative Example 2 | PTFE | 12.9 | 0.5 | 4,4'-Methylenebis(2-methylbenzene-1,3-diol) | 20 | 1.5 |
| Comparative Example 3 | PTFE | 12.9 | 0.5 | N,N'-Dinaphthyl-1,4-phenylenediamine | 20 | 1.5 |
| Comparative Example 4 | PTFE | 12.9 | 0.5 | 2-tert-Butylhydroquinone | — | 2.0 |
| Comparative Example 5 | PTFE | 12.9 | 0.5 | 2-tert-Butylhydroquinone | — | 2.0 |
| Comparative Example 6 | PTFE | 12.9 | 0.5 | 4-Methoxyphenol | — | 2.0 |
| Comparative Example 7 | PTFE | 12.9 | 0.5 | 2-tert-Butylcatechol | — | 2.0 |
| Comparative Example 8 | PTFE | 12.9 | 0.5 | 4-Methylphenol | — | 2.0 |

| | Polymerization inhibitor | | | | Seal member | |
| | SPb [(J/ cm³)⁰·⁵] | Melting point [° C.] | Number of phenolic hydroxyl groups | Shape of seal member | SPp-SPb [(J/ cm³)⁰·⁵] | Proportion of domains of polymerization inhibitor with short diameter of 5 μm or greater among domains of polymerization inhibitor [area %] |
|---|---|---|---|---|---|---|
| Example 1 | 25.47 | 127 | 2 | Gasket | 12.57 | 12 |
| Example 2 | 28.50 | 174 | 2 | Gasket | 15.60 | 12 |
| Example 3 | 22.20 | 215 | 2 | Gasket | 9.30 | 12 |
| Example 4 | 22.20 | 99 | 2 | Gasket | 9.30 | 12 |
| Example 5 | 19.76 | 71 | 1 | Gasket | 6.86 | 12 |
| Example 6 | 25.47 | 58 | 2 | Gasket | 12.57 | 12 |
| Example 7 | 23.02 | 57 | 1 | Gasket | 10.12 | 12 |
| Example 8 | 22.77 | 32 | 1 | Gasket | 9.87 | 12 |

TABLE 2-continued

| | | | | | | |
|---|---|---|---|---|---|---|
| Example 9 | 24.86 | 125 | 2 | Gasket | 11.96 | 12 |
| Example 10 | 18.50 | 183 | 0 | Gasket | 5.60 | 12 |
| Example 11 | 24.16 | 65 | 0 | Gasket | 11.26 | 12 |
| Example 12 | 25.47 | 127 | 2 | Gasket | 9.27 | 12 |
| Example 13 | 25.47 | 127 | 2 | Gasket | 11.97 | 12 |
| Example 14 | 25.47 | 127 | 2 | Gasket | 11.77 | 12 |
| Example 15 | 25.47 | 127 | 2 | Gasket | 12.57 | 12 |
| Example 16 | 25.47 | 127 | 2 | Gasket | 12.57 | 8 |
| Example 17 | 25.47 | 127 | 2 | Gasket | 12.57 | 16 |
| Example 18 | 25.47 | 127 | 2 | Gasket | 12.57 | 24 |
| Example 19 | 25.47 | 127 | 2 | Gasket | 12.57 | 12 |
| Example 20 | 25.47 | 127 | 2 | Gasket | 12.57 | 12 |
| Example 21 | 25.47 | 127 | 2 | Gasket | 12.57 | 12 |
| Example 22 | 25.47 | 127 | 2 | Gasket | 12.57 | 12 |
| Example 23 | 25.47 | 127 | 2 | Packing | 12.57 | 12 |
| Example 24 | 25.47 | 127 | 2 | O-ring | 12.57 | 12 |
| Example 25 | 30.32 | 215 | 4 | Gasket | 14.12 | 12 |
| Example 26 | 22.20 | 215 | 2 | Gasket | 6.00 | 12 |
| Comparative Example 1 | — | — | — | Gasket | — | — |
| Comparative Example 2 | 30.32 | 215 | 4 | Gasket | 17.42 | 12 |
| Comparative Example 3 | 38.44 | 227 | 0 | Gasket | 25.54 | 13 |
| Comparative Example 4 | 25.47 | 127 | 2 | Gasket | 12.57 | 30 |
| Comparative Example 5 | 25.47 | 127 | 2 | Gasket | 12.57 | 35 |
| Comparative Example 6 | 23.02 | 57 | 2 | Gasket | 10.12 | 35 |
| Comparative Example 7 | 25.47 | 58 | 2 | Gasket | 12.57 | 35 |
| Comparative Example 8 | 22.77 | 32 | 2 | Gasket | 9.87 | 35 |

Evaluation of Seal Member

The following characteristics of the seal members in each example and each comparative example were evaluated, and the results are listed in Table 3.

Rate of Change in Mass Before and After Dipping

ASTM micro-type dumbbell test pieces were punched out from the obtained seal members to produce dip samples. The obtained dip samples were set on a ceiling portion of a 2 L pressure-resistant container, and the pressure-resistant container was filled with a mixed solution containing a styrene monomer and a butadiene monomer at a ratio of 1:1 (v:v) without containing a polymerization inhibitor such that the mixed solution was not in contact with the dip samples.

The container was allowed to stand under the conditions of 75° C. and 0.8 MPa for 30 days, and the samples were taken out and dried. The mass of the dried samples after dipping was measured, and the amount of an increase in mass from the samples before the dipping test was measured. Further, the amount of an increase is derived from the solid content generated by polymerization of the butadiene monomer gas in the samples.

The evaluation ranks according to the following evaluation criteria are also listed in Table 3.

Evaluation Criteria

A: 1.0% by mass or less

B: greater than 1.0% by mass and 2.0% by mass or less

C: greater than 2.0% by mass and 3.0% by mass or less

D: greater than 3.0% by mass and 4.0% by mass or less

E: greater than 4.0% by mass

Residual rate of Polymerization Inhibitor

ASTM micro-type dumbbell test pieces were punched out from the obtained seal members to produce dip samples. The obtained dip samples were set on a ceiling portion of a 2 L pressure-resistant container, and the pressure-resistant container was filled with a mixed solution containing a styrene monomer and a butadiene monomer at a ratio of 1:1 (v:v) without containing a polymerization inhibitor such that the mixed solution was not in contact with the dip samples.

The container was allowed to stand under the conditions of 50° C. and 1.0 MPa for 5 days, and the samples were taken out and dried.

The dried samples were taken out and used as measurement samples. The measurement was performed using pyrolysis GC-MS under the following conditions, and the residual rate of the polymerization inhibitor in the sheet was evaluated from the peak position and the area of the obtained spectrum.

Measurement Conditions

Temperature and time for pyrolysis: 445° C.×5 sec

GC part column: Ultra alloy-1

Conditions for increasing temperature: 50° C.→300° C. (temperature increase rate of 20° C./min)

The evaluation ranks according to the following evaluation criteria are also listed in Table 3.

Evaluation Criteria

A: 92% by mass or greater

B: 87% by mass or greater and less than 92% by mass

C: 82% by mass or greater and less than 87% by mass

D: less than 82% by mass

Compression Set

The compression set in the present disclosure is obtained by measuring the strain after 25% compression at 150° C. for 70 hours and showing the percentage of non-recovery after release of compression by setting the compression amount to 100%. Specifically, the compression set was measured by the following procedures.

(1) Test pieces with a size of 10 mm×10 mm×2 mm were prepared from the seal members.

(2) The seal members were held at 150° C. for 70 hours in a state of 25% compressive deformation.

(3) The force causing the compressive deformation was removed. That is, the seal members were released from the compression.

Temperature at release: 23° C., release time: 0.5 hours (4) The cured product released from the compression was intended to return (recover) to the shape before the compression.

The compression set is the percentage of deformation remaining even after removal of the force causing compressive deformation. That is, when the shape of the cured product after being released from compression is the compressed and deformed shape before the release, the compression set is 100%. On the contrary, when the cured product is completely returned to the shape before the compression, the compression set is 0%.

The evaluation ranks according to the following evaluation criteria are also listed in Table 3.

Evaluation Criteria

A: 7% or less

B: greater than 7% and 14% or less

C: greater than 14%

TABLE 3

| | Rate of change in mass before and after dipping | | Residual rate of polymerization inhibitor | | Compression set | |
|---|---|---|---|---|---|---|
| | Rate of change (mass %) | Rank | Residual rate (mass %) | Rank | Value (%) | Rank |
| Example 1 | 0.1 | A | 95 | A | 5 | A |
| Example 2 | 0.1 | A | 95 | A | 5 | A |
| Example 3 | 0.1 | A | 95 | A | 5 | A |
| Example 4 | 0.3 | A | 92 | A | 5 | A |
| Example 5 | 1.5 | B | 92 | A | 5 | A |
| Example 6 | 0.6 | A | 90 | B | 5 | A |
| Example 7 | 0.9 | A | 90 | B | 5 | A |
| Example 8 | 1.1 | B | 90 | B | 5 | A |
| Example 9 | 0.2 | A | 92 | A | 5 | A |
| Example 10 | 1.5 | B | 92 | A | 5 | A |
| Example 11 | 0.9 | A | 90 | B | 5 | A |
| Example 12 | 2.0 | B | 88 | B | 13 | B |
| Example 13 | 0.2 | A | 92 | A | 6 | A |
| Example 14 | 0.2 | A | 92 | A | 6 | A |
| Example 15 | 0.2 | A | 92 | A | 6 | A |
| Example 16 | 0.1 | A | 95 | A | 5 | A |
| Example 17 | 0.3 | A | 94 | A | 6 | A |
| Example 18 | 0.5 | A | 93 | A | 9 | A |
| Example 19 | 0.1 | A | 95 | A | 5 | A |
| Example 20 | 0.1 | A | 95 | A | 7 | A |
| Example 21 | 0.1 | A | 95 | A | 8 | A |
| Example 22 | 0.1 | A | 95 | A | 9 | A |
| Example 23 | 0.5 | A | 90 | B | 10 | A |
| Example 24 | 0.5 | A | 90 | B | 10 | A |
| Example 25 | 2.0 | B | 88 | B | 13 | B |
| Example 26 | 2.3 | C | 86 | C | 13 | B |
| Comparative Example 1 | 8.0 | E | — | — | 5 | A |
| Comparative Example 2 | 6.0 | E | 81.5 | D | 7 | A |
| Comparative Example 3 | 6.3 | E | 75.5 | D | 7 | A |
| Comparative Example 4 | 4.0 | D | 85 | C | 9 | A |
| Comparative Example 5 | 4.5 | E | 85 | C | 9 | A |
| Comparative Example 6 | 4.5 | E | 85 | C | 9 | A |
| Comparative Example 7 | 4.5 | E | 85 | C | 9 | A |
| Comparative Example 8 | 4.5 | E | 85 | C | 9 | A |

According to the present disclosure, the polymerization inhibitor is evenly distributed in the gaps inside the gasket by impregnating the gaps with the polymerization inhibitor in which the difference between the SP value of the base material and the SP value of the polymerization inhibitor is in an appropriate range and controlling the dispersed state of the polymerization inhibitor to a state with less lumps, and the desorption and elution of the polymerization inhibitor are unlikely to occur when the polymerization inhibitor has an affinity for the base material. Therefore, it is possible to provide a seal member that prevents the flower blooming phenomenon for a long period of time even when the polymerizable compound permeates into the gaps of the gasket and does not inhibit the polymerization reaction of the polymerizable monomer in a pipe or a device.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-061806, filed Apr. 6, 2023, which is hereby incorporated by reference herein in its entirety.

What is claimed is:

1. A seal member comprising:

a resin portion that contains a resin and a polymerization inhibitor, wherein when an SP value $[(J/cm^3)^{0.5}]$ of the resin is defined as SPb and an SP value $[(J/cm^3)^{0.5}]$ of the polymerization inhibitor is defined as SPp, a relationship of Expression (1) is satisfied, $$SPp - SPb \leq 16.37 \qquad \text{Expression (1)}$$

wherein a cross section of the resin portion of the seal member contains a domain of the polymerization inhibitor, and when an area of the polymerization inhibitor in the cross section is set to 100% by area, a proportion of the domain of the polymerization inhibitor with a short diameter of 5 μm or greater is 25% by area or less.

2. The seal member according to claim 1, wherein a content of the polymerization inhibitor in the seal member is 0.1% by mass or greater and 10.0% by mass or less.

3. The seal member according to claim 1, wherein when the area of the polymerization inhibitor in the cross section is set to 100% by area, the proportion of the domain of the polymerization inhibitor with a short diameter of 5 μm or greater is 15% by area or less.

4. The seal member according to claim 1, wherein the resin portion has a Young's modulus of 0.1 GPa or greater and 30.0 GPa or less.

5. The seal member according to claim 1, wherein the resin is polytetrafluoroethylene.

6. The seal member according to claim 1, wherein the seal member has a structure in which the polymerization inhibitor contains two phenolic hydroxyl groups.

7. The seal member according to claim 1, wherein the polymerization inhibitor has a melting point of 120° C. or higher.

8. The seal member according to claim 1, wherein the seal member is a gasket.

* * * * *